United States Patent

Horiya et al.

(10) Patent No.: US 6,635,349 B2
(45) Date of Patent: Oct. 21, 2003

(54) FRICTION MATERIAL FOR BRAKE

(75) Inventors: Takao Horiya, Saitama (JP); Osao Ogiwara, Saitama (JP); Masanori Kato, Saitama (JP)

(73) Assignees: Akebono Brake Industry Co., Ltd., Tokyo (JP); Akebono Research and Development Centre Ltd., Saitama (JP)

(*) Notice: Subject to any disclaimer, the term of this patent is extended or adjusted under 35 U.S.C. 154(b) by 0 days.

(21) Appl. No.: 09/984,954

(22) Filed: Oct. 31, 2001

(65) Prior Publication Data

US 2002/0086159 A1 Jul. 4, 2002

(30) Foreign Application Priority Data

Oct. 31, 2000 (JP) ...................... P2000-332977

(51) Int. Cl.$^7$ ................................. B32B 9/00
(52) U.S. Cl. .................... 428/408; 428/293.1; 428/689; 428/702; 428/608; 523/149; 260/998.13; 106/36
(58) Field of Search ............................. 428/293.1, 323, 428/364, 608, 372, 702, 408, 685; 106/36, 623, 626; 523/156, 149, 153; 260/998.13

(56) References Cited

U.S. PATENT DOCUMENTS 4,374,211 A 2/1983 Gallagher et al.
5,725,077 A 3/1998 Taylor et al.

FOREIGN PATENT DOCUMENTS

EP    1 031 754    8/2000
NL    25 35 527    8/1975

OTHER PUBLICATIONS

Translation of French Search Report dated Jun. 13, 2002.

Primary Examiner—Deborah Jones
Assistant Examiner—Abraham Bahta
(74) Attorney, Agent, or Firm—Finnegan, Henderson, Farabow, Garrett, & Dunner LLP

(57) ABSTRACT

The present invention provides a friction material for brake not containing materials including heavy metals such as Cu or antimony. The friction material contains a fibrous component, a binding component and a friction modifying component, wherein magnesium oxide (MgO) and graphite are contained in a friction material in the amount of 45 to 80 vol %, and volume ratio (MgO/graphite) of magnesium oxide (MgO) to graphite is 1/1 to 4/1.

4 Claims, 2 Drawing Sheets

FRICTION MATERIAL FOR BRAKE

BACKGROUND OF THE INVENTION

1. Field of the Invention

The present invention relates to a friction material for brake to be used for brakes of vehicles or industrial machines, and more particularly to such a friction material excellent in frictional performance at high temperatures and mechanical strength without containing Cu based metals or antimony compound.

2. Description of the Related Art

With respect to friction materials, in non-asbestos based friction materials which have gradually become a main stream in substitution for existing asbestos based friction materials, there are employed many kinds of fibrous components, for example, for reinforcing strength, maintaining friction coefficient and improving qualities, and are much used metal fibers such as Cu fiber, steel fiber and the like.

Nowadays in general, the non-asbestos based friction materials contain about 0 to 20 vol % Cu fiber or Cu powder. Cu is useful for reinforcing strength, heightening friction coefficient of friction materials, and further maintaining friction coefficient at 400° C. or higher and increasing heat radiating efficiency. Being different from steel fibers, Cu has characteristics less to have aggressiveness, which increases a wear amount of an opposite member such as a rotor, and to generate rusts.

Further, other than fibrous components, friction modifying components and binding components are contained therein, and such as $Sb_2S_3$ containing antimony of a heavy metal is served as friction modifying components.

Antimony compounds containing antimony of heavy metals as $Sb_2S_3$ or $Sb_2O_3$ are normally contained 0 to several vol % in the non-asbestos based friction material, and are useful for heightening lubrication at high temperatures and increasing noncombustibility of friction materials.

However, recently for attention around environmental sanitation, it has been demanded from mainly Europe and America to develop such friction materials without using heavy metal groups as said above.

Friction materials not containing heavy metals as Cu or antimony but having equivalent characteristics to those of the existing friction materials will be necessary hereafter, but as to Cu based materials, substituting materials therefor have not yet been found. In place of Cu based materials, there have conventionally existed semi-metallic friction materials using steel fibers having, however, the aggressiveness and being apt to causing rusts.

SUMMARY OF THE INVENTION

The invention is accordingly to solve problems as mentioned above, and it is an object of the invention to offer a friction material for brake without containing materials having heavy metals such as Cu or antimony. It is another object of the invention to offer a friction material for brake excellent in frictional performance at high temperatures and mechanical strength.

For accomplishing the objects of the invention, inventors of this invention made studies on materials substituting for Cu fibers, Cu powders, powders of $Sb_2S_3$ or $Sb_2O_3$. As a result, they found that the above mentioned objects can be accomplished by such a friction material containing magnesium oxide (MgO) and graphite at specific amounts and specific rates. Note that MgO has the low aggressiveness because of being comparatively soft among ceramic particle and high in heat conductivity, and graphite maintains friction coefficient at 400° C. or lower and being useful for securing lubricity and heat conductivity.

That is, the present invention is concerned with a friction material containing fibrous components, binding components and friction modifying components, and is characterized in that magnesium oxide (Mgo) and graphite are contained in a friction material in the amount of 45 to 80 vol %, and volume ratio (MgO/graphite) of magnesium oxide (MgO) to graphite is 1/1 to 4/1.

DETAILED DESCRIPTION OF THE PREFERRED EMBODIMENTS

The present invention will be explained in detail as follows.

The present invention is concerned with the friction material containing fibrous components, binding components and friction modifying components, and contains magnesium oxide (MgO) and graphite in the specific amounts as the friction modifying components.

As the fibrous components, there are organic fibers like aramid fiber or acrylic fiber, and inorganic fibers like glass fiber, rock wool fiber, carbon fiber or ceramic fiber. The fibrous components may use one kind or appropriately combination including two kinds or more selected from them.

As the binding components, phenolic resin, urea resin, melamine resin, or thermosetting resins of their modified resins are taken up.

The friction modifying components are magnesium oxide (MgO) and graphite. As friction modifying components other than MgO and graphite, substances having lubricity such as cashew dust, rubber dust, alumina powder, silica powder, zirconium silicate, barium sulfate or calcium carbonate may be employed.

MgO and graphite of the friction modifying components are 45 to 80 vol % contained in the friction material.

Figure 1:
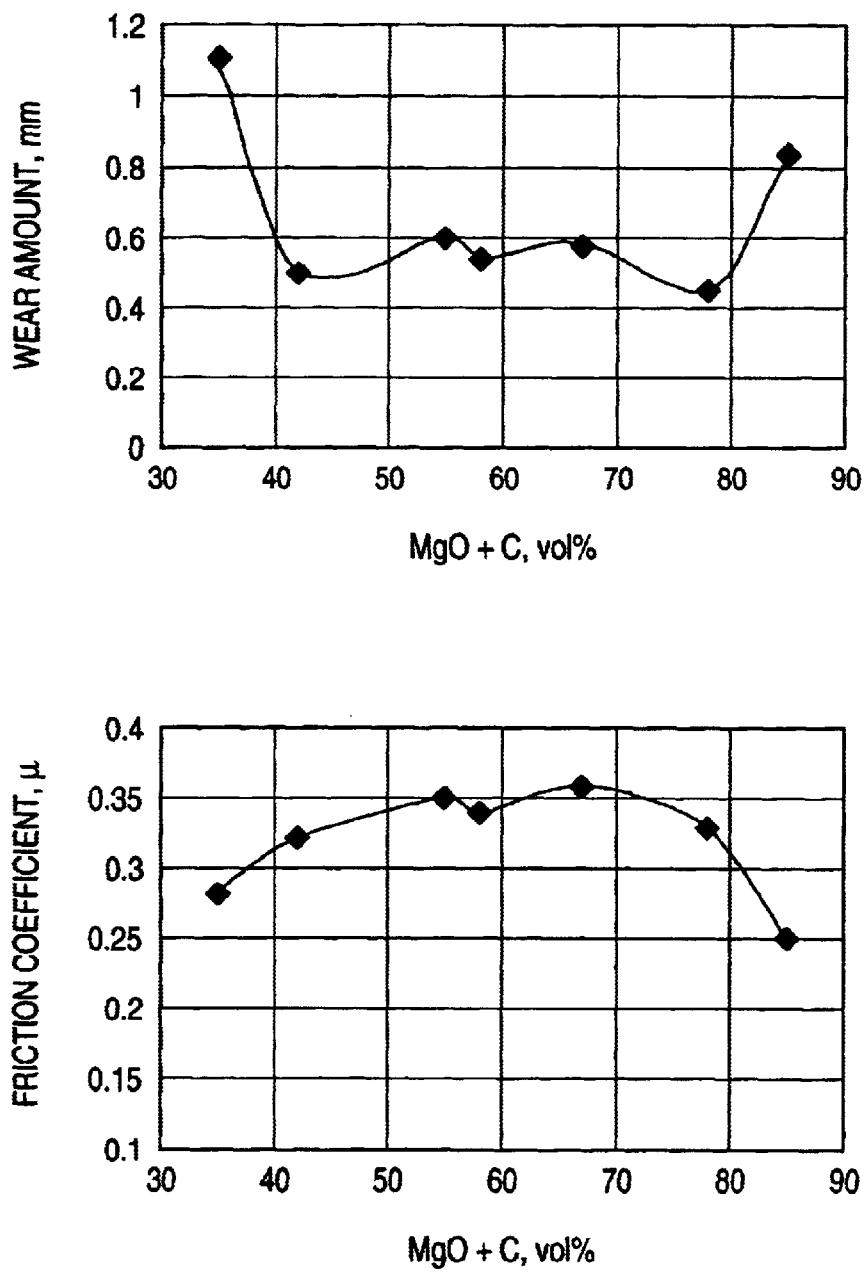
FIG. 1 shows the relation in the containing amount, the wear amount and the friction coefficient of MgO and graphite in the friction material.
Figure 2:
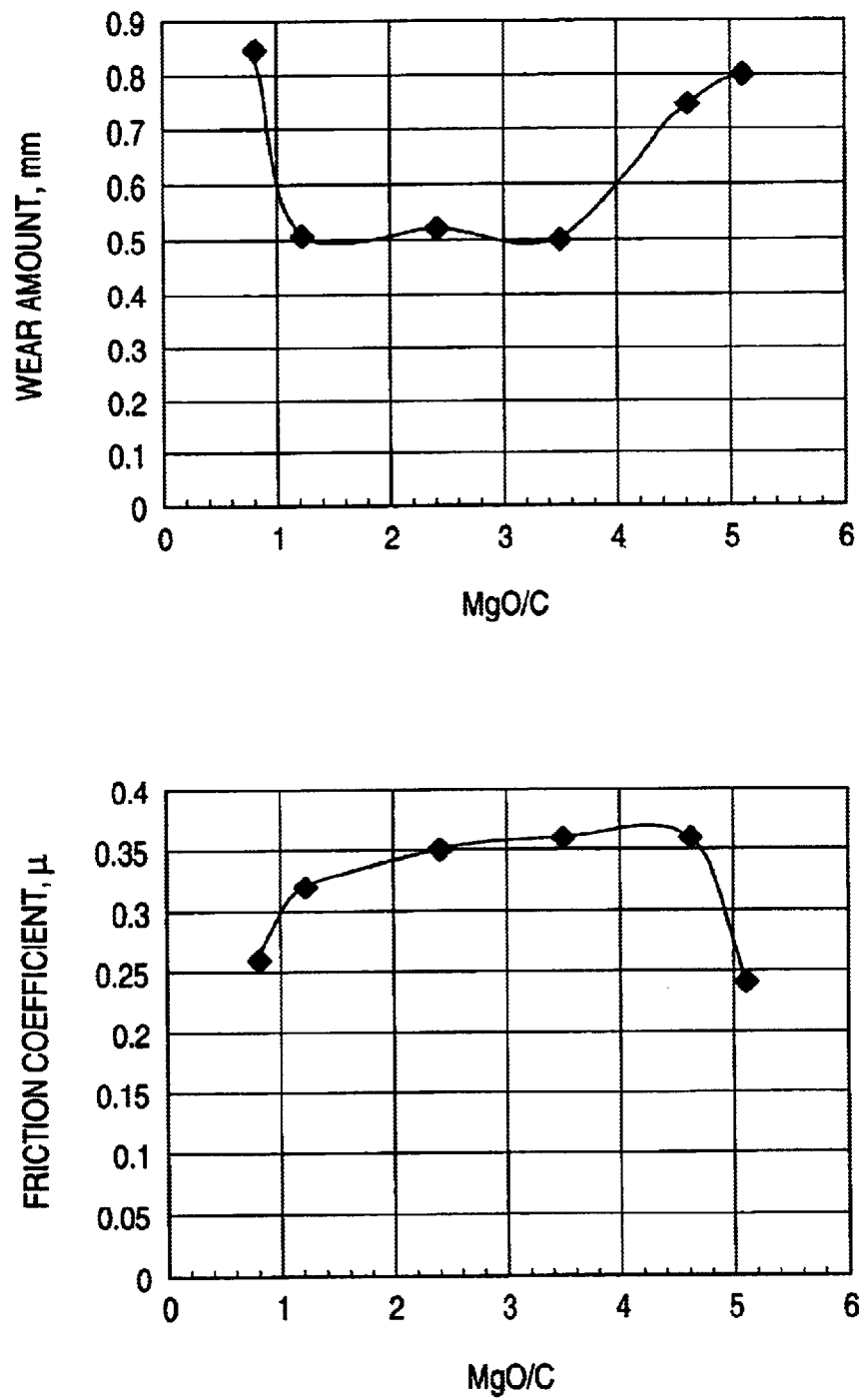
FIG. 2 shows the relation in the volume ratio, the wear amount and the friction coefficient of MgO/graphite in the friction material.

FIGS. 1 and 2 show results of changing to study the containing amount and the mixing ratio of MgO and graphite in the friction material. Practically, as an opposite member, test pieces of a cast iron of 1/10 size of a rotor were repeatedly subjected to friction tests at high temperatures (up to 500° C.) by use of Dynamo system inertia type friction tester.

FIG. 1 shows the results of changing the containing amounts of MgO and graphite in the friction material, while FIG. 2 shows the results of fixing the containing amount of MgO+graphite in the friction material at 60 vol % and changing the volumetrically mixing ratio of these two kinds, As a result, it was found that there is a tendency that if containing less than 45 vol % of MgO and graphite, the friction coefficient at high temperatures is low and the wear is extreme, while if exceeding 80 vol %, the mechanical strength at high temperatures is low and the wear amount increases.

Further, as seen from FIG. 2, It was also found that there is a tendency that the volume ratio of MgO and graphite is preferably 1/1 to 4/1, and more preferably 1/1 to 3/1. If MgO is less than 1 with respect to graphite, heat resistance at high temperatures decreases, and if exceeding 4, the rotor of the opposite material as well as the wear amount of the friction material considerably increase at high temperatures.

MgO in the present invention is enough with generally used ones, and any of active MgO and electromelting MgO is sufficient. An average diameter of MgO particle is desirably in a range between 10 μm and 400 μm, and more desirably in a range between 50 μm and 200 μm. If employing those within their ranges, it is possible to maintain the aggressiveness low and a reinforcing effect as a structural material high.

Graphite in the present invention is enough with such as ordinarily used in the friction material, and any of natural graphite or artificial graphite is sufficient. An average diameter of graphite particle is desirably in a range between 5 μm and 500 μm, and more desirably in a range between 50 μm and 150 μm.

The friction material for brakes of the invention may be produced through an ordinary process, and specifically produced as follows.

At first, the above mentioned raw materials for the friction material are mixed in a blender or the like, and an obtained particle-like mixture is thrown into a preforming mold to form preformed materials. Then, the preformed materials are subjected to a pressing-heating formation, and further to a heat treatment into a braking friction material of the present invention. The conditions of the preforming, the pressing-heating and the heat treatment are not especially limited, but performed through the ordinary process.

EXAMPLES

The present invention will be specifically explained, referring to embodiments, but the invention is not limited thereto.

Used were Kevlar fiber (trade name, made by duPont as the fibrous components, phenolic resin as the binding components, and MgO and graphite as the friction modifying components.

Other friction modifying components were rubber dust, cashew dust and barium sulfate.

With the raw materials of compositions shown in Table 1, the friction materials of Examples 1 to 7 and Comparative Examples 1 to 8 were produced. Note that in Comparative Example 7, the steel fiber and the iron powder were used, and in Comparative Example 8, the conventional non-asbestos based friction material with Cu fiber was used.

TABLE 1

| Friction material No. | | A | B | C | D | Cashew dust | Rubber dust | BaSO$_4$ | E | F | G |
|---|---|---|---|---|---|---|---|---|---|---|---|
| Ex. | 1 | 55 | 23 | 78 | 2.4 | 4 | 0 | 5 | 7 | 6 | — |
|  | 2 | 58 | 22 | 80 | 2.6 | 0 | 0 | 7 | 7 | 6 | — |
|  | 3 | 48 | 14 | 62 | 3.4 | 10 | 5 | 10 | 7 | 6 | — |
|  | 4 | 40 | 10 | 50 | 4.0 | 15 | 5 | 17 | 7 | 6 | — |
|  | 5 | 35 | 10 | 45 | 3.5 | 15 | 12 | 16 | 7 | 6 | — |
|  | 6 | 23 | 23 | 46 | 1.0 | 15 | 11 | 15 | 7 | 6 | — |
|  | 7 | 50 | 25 | 75 | 2.0 | 5 | 0 | 5 | 8 | 7 | — |
| Com. | 1 | 60 | 28 | 88 | 2.1 | 2 | 0 | 2 | 4 | 4 | — |
|  | 2 | 42 | 48 | 90 | 0.9 | 0 | 0 | 2 | 4 | 4 | — |
|  | 3 | 30 | 38 | 88 | 0.8 | 10 | 0 | 9 | 7 | 6 | — |
|  | 4 | 55 | 12 | 67 | 4.6 | 5 | 5 | 10 | 7 | 6 | — |
|  | 5 | 25 | 10 | 35 | 2.5 | 15 | 15 | 22 | 7 | 6 | — |
|  | 6 | 25 | 5 | 30 | 5.0 | 15 | 15 | 27 | 7 | 6 | — |
|  | 7 | 5 | 30 | 35 | 0.2 | 8 | 10 | 7 | 0 | 0 | 40[a] |
|  | 8 | 5 | 8 | 13 | 0.6 | 12 | 10 | 10 | 15 | 25 | 15[b] |

[a] (Steel fiber)/(Iron powder) = 25/15
[b] Cu fiber
Ex.: Example
Com.: Comparative Example
A: MgO (Vol %)
B: Graphite (Vol %)
C: MgO + Graphite (Total vol %)
D: MgO/Graphite
E: Phenolic resin (Vol %)
F: Kevlar ™ fiber (Vol %)
G: Metal fiber and metal powder (Vol %)

As to production of the friction materials, after the friction raw materials were mixed fully and uniformly with the blender, particle-like mixture was thrown into the preforming mold and pressed at about 7.2 MPa for about 5 seconds at room temperature. Then, the preformed materials were formed. Subsequently, the preformed materials were set in a heat-forming mold together with back plates previously coated with a phenolic resin-based adhesive agent on the surfaces thereof, and heat-formed by pressing at 13 MPa at 160° C. for 5 minutes, and further heat-treated at 200° C. for 5 hours to produce the friction materials for brake.

By use of the produced braking friction material and the rotor described as below, the wear tests were carried out by the full size dynamometer. The testing conditions are as follows:

Rotor Material:
  Cast material (FC200) or lightweight intermetallic compound (TiAl)
Testing Pattern:
  Initial velocity 85 km/h
  Deceleration 4.41 m/s$^2$(0.45G)
  Temperature before starting brake 300° C. or 500° C.
  Repeating 45 times
Lapping Conditions:
  Initial velocity 50 km/h
  Deceleration 3.43 m/s$^2$(0.35G)
  Temperature be-fore starting brake 135° C.
  Repeating 100 times
Measuring Items:
  Friction coefficient
  Wear amounts (measuring changes in thickness of the friction materials and the rotor after the wear tests at 500° C.)

The results of the wear test are shown in Table 2.

TABLE 2

| | | Friction coefficient ($\mu$) | | | Wear amount at 500° C. | | |
|---|---|---|---|---|---|---|---|
| | | Braking temperature | | | | | |
| | | 300° C. | | 500° C. | | | |
| | | Number of braking | | | Friction | | |
| | | 20th time | 40th time | 20th time | 40th time | material (mm) | Rotor ($\mu$m) | Rotor material |
| Ex. | 1 | 0.35 | 0.35 | 0.34 | 0.33 | 0.5 | 5 | Cast iron |
| | 2 | 0.34 | 0.33 | 0.33 | 0.34 | 0.4 | 4 | Cast iron |
| | 3 | 0.35 | 0.35 | 0.33 | 0.33 | 0.3 | 3 | Cast iron |
| | 4 | 0.36 | 0.36 | 0.35 | 0.34 | 0.6 | 5 | Cast iron |
| | 5 | 0.35 | 0.36 | 0.34 | 0.34 | 0.5 | 6 | Cast iron |
| | 6 | 0.35 | 0.34 | 0.35 | 0.34 | 0.4 | 5 | TiAl |
| | 7 | 0.33 | 0.33 | 0.34 | 0.34 | 0.4 | 4 | TiAl |
| Com. | 1 | 0.31 | 0.31 | 0.38 | 0.25 | 1.0 | 21 | Cast iron |
| | 2 | 0.34 | 0.33 | 0.37 | 0.24 | 1.5 | 24 | Cast iron |
| | 3 | 0.36 | 0.35 | 0.34 | 0.30 | 1.3 | 25 | Cast iron |
| | 4 | 0.31 | 0.32 | 0.31 | 0.28 | 1.6 | 16 | Cast iron |
| | 5 | 0.36 | 0.35 | 0.36 | 0.21 | 2.8 | 13 | Cast iron |
| | 6 | 0.32 | 0.32 | 0.31 | 0.22 | 3.8 | 17 | TiAl |
| | 7 | 0.33 | 0.33 | 0.34 | 0.34 | 0.4 | 4 | Cast iron |
| | 8 | 0.34 | 0.33 | 0.35 | 0.34 | 0.4 | 5 | Cast iron |

Ex.: Example
Com.: Comparative Example

The friction materials for brakes in Examples 1 to 7 show equivalent values to or more excellent values than those of the braking friction materials of Comparative Examples 7 and 8 (the existing friction materials).

Comparative Examples 1 to 6 (the friction materials in which MgO and graphite are out of the range of the present invention) are inferior to Comparative Examples 7 and 8 in the stability of the friction coefficient and the wear amount. In particular, in the wear test at 500° C., the wear amount of the friction material and the rotor materials are 2 to 10 times of those of comparative Examples 7 and 8, and the friction coefficient is less than 0.3 at 40 times.

In accordance with the invention, it is possible to offer the friction material for brake having the frictional performance at high temperatures and the mechanical properties equivalent to or more than those of the conventional non-asbestos based friction material, though not containing Cu fiber or heavy metals such as Cu powder and SbS powder.

What is claimed is:

1. A friction material for brake, comprising:
   a fibrous component;
   a binding component; and
   a friction modifying component,
   wherein magnesium oxide (MgO) and graphite are contained in said friction material in the amount of 45 to 80 vol %,
   wherein the volume ratio (MgO/graphite) of magnesium oxide (MgO) to graphite is 1/1 to 4/1, and wherein the average diameter of MgO particles is in a range between 50 $\mu$m and 200 $\mu$m.

2. The friction material according to claim 1, wherein the volume ratio (MgO/graphite) of magnesium oxide (MgO) to graphite is 1/1 to 3/1.

3. The friction material according to claim 1, wherein an average diameter of graphite particle is in a range between 5 $\mu$m and 500 $\mu$m.

4. The friction material according to claim 3, wherein an average diameter of graphite particle is in a range between 50 $\mu$m and 150 $\mu$m.

* * * * *